US012806999B2

(12) United States Patent
Kim et al.

(10) Patent No.: US 12,806,999 B2
(45) Date of Patent: Nov. 24, 2026

(54) METHOD OF CHANGING COCKPIT LAYOUT ACCORDING TO DISPLAY MODE AND COCKPIT SYSTEM USING THE SAME

(71) Applicant: HYUNDAI MOBIS CO., LTD., Seoul (KR)

(72) Inventors: Kyung Hoon Kim, Seongnam-si (KR); Hyun Jun An, Gunpo-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/770,161

(22) Filed: Jul. 11, 2024

(65) Prior Publication Data

US 2025/0214437 A1 Jul. 3, 2025

(30) Foreign Application Priority Data

Dec. 28, 2023 (KR) ........................ 10-2023-0194933

(51) Int. Cl.
*B60K 35/29* (2024.01)
*B60K 35/22* (2024.01)
*G06F 3/01* (2006.01)

(52) U.S. Cl.
CPC .............. *B60K 35/29* (2024.01); *B60K 35/22* (2024.01); *G06F 3/012* (2013.01); *B60K 2360/21* (2024.01); *B60K 2360/741* (2024.01)

(58) Field of Classification Search
CPC ................ G06F 3/012; B60K 2360/21; B60K 2360/741; B60K 35/29; B60K 35/22
See application file for complete search history.

(56) References Cited

U.S. PATENT DOCUMENTS

| | | | | | |
|---|---|---|---|---|---|
| 4,831,366 | A * | 5/1989 | Iino | G02B 27/0149 | 340/980 |
| 6,129,404 | A * | 10/2000 | Mattarella | B60N 2/36 | 296/65.09 |
| 6,583,773 | B1 * | 6/2003 | Nogami | B60K 35/60 | 345/905 |
| 2003/0128103 | A1 * | 7/2003 | Fitzpatrick | B60K 35/60 | 345/1.3 |
| 2004/0140959 | A1 * | 7/2004 | Matsumura | B60K 35/60 | 345/173 |
| 2005/0180151 | A1 * | 8/2005 | Inayoshi | B60K 35/00 | 362/488 |

(Continued)

OTHER PUBLICATIONS

Extended European Search Report Issued on Mar. 28, 2025, in Counterpart European Patent Application No. 24187904.8 (7 Pages in English).

*Primary Examiner* — Christopher E Leiby
(74) *Attorney, Agent, or Firm* — NSIP Law

(57) ABSTRACT

A cockpit system for changing a display layout according to a display mode in a mobile device, a method therefor, and a display system for a vehicle are provided. The cockpit system includes a front display disposed in front of a driver's seat and a passenger seat of the mobile device, the front display including a plurality of display areas, a controller to move the front display downward, in response to a low mode being applied among a plurality of display modes, and a see-through panel to provide information to a driver seated on the driver's seat and a passenger seated on the passenger seat by transmitting light from a lower area of the front display to the see-through panel, after the front display is moved downward.

16 Claims, 10 Drawing Sheets

(56) References Cited

U.S. PATENT DOCUMENTS

| | | | | |
|---|---|---|---|---|
| 2009/0058845 | A1* | 3/2009 | Fukuda | B60K 35/10 345/214 |
| 2009/0132130 | A1* | 5/2009 | Kumon | B60K 35/211 701/49 |
| 2014/0153168 | A1* | 6/2014 | Hida | H05K 7/02 361/679.01 |
| 2014/0350784 | A1* | 11/2014 | Imai | B60K 35/22 701/36 |
| 2016/0193923 | A1* | 7/2016 | Kim | B60K 35/223 296/70 |
| 2017/0291493 | A1* | 10/2017 | Bostick | B60K 35/25 |
| 2018/0107320 | A1* | 4/2018 | Im | B60K 35/00 |
| 2018/0181122 | A1* | 6/2018 | Kadoya | B60K 35/00 |
| 2018/0262719 | A1* | 9/2018 | Jo | B60R 1/23 |
| 2018/0373031 | A1* | 12/2018 | Nakayama | B60K 35/00 |
| 2019/0152349 | A1* | 5/2019 | Perkins | B62D 1/181 |
| 2019/0255945 | A1* | 8/2019 | Yamazaki | B60R 11/0229 |
| 2020/0369223 | A1 | 11/2020 | Hansen et al. | |
| 2021/0124104 | A1 | 4/2021 | Pastushenko | |
| 2021/0300266 | A1 | 9/2021 | Seegers et al. | |
| 2021/0309123 | A1* | 10/2021 | Kang | B60N 2/14 |
| 2023/0069348 | A1 | 3/2023 | Park | |
| 2023/0191909 | A1* | 6/2023 | Park | B60K 35/00 348/148 |
| 2023/0391193 | A1* | 12/2023 | Huang | G06F 3/0481 |
| 2024/0281133 | A1* | 8/2024 | Ohyama | G06F 3/016 |
| 2024/0338117 | A1* | 10/2024 | Sato | G06F 3/04847 |
| 2024/0375552 | A1* | 11/2024 | Han | B60N 2/0244 |
| 2024/0391360 | A1* | 11/2024 | Deshmukh | B60N 2/0256 |
| 2025/0200998 | A1* | 6/2025 | Higuchi | G06F 3/04845 |

* cited by examiner

METHOD OF CHANGING COCKPIT LAYOUT ACCORDING TO DISPLAY MODE AND COCKPIT SYSTEM USING THE SAME

CROSS-REFERENCE TO RELATED APPLICATION(S)

This application is based on and claims priority under 35 U.S.C. § 119 to Korean Patent Application No. 10-2023-0194933, which was filed in the Korean Intellectual Property Office on Dec. 28, 2023, the entire disclosure of which is incorporated herein by reference for all purposes.

BACKGROUND

1. Field

The disclosure relates to a display in a mobile device such as a vehicle or an uncrewed aerial vehicle (UAV), and more particularly, to a method of changing a cockpit layout according to a display mode and a cockpit system using the same.

2. Description of the Related Art

As cars have recently become digital, many controllers are installed, and various communication functions between them enable a vehicle to be remotely located and discover a nearby charging station through Internet or a smartphone. All information about the current state of the vehicle is monitored in real time, such as battery charging or preconditioning performed simply by a touch on a button. In addition, an intelligent driving assistance system acquires information about road driving to create a more convenient driving environment for the driver.

In this regard, a cluster is used, which provides, for example, basic vehicle functions such as a speed, a mileage, an odometer, and an engine revolutions per minute (RPM) dashboard. In addition, it provides, for example, charging infrastructure network information, a distance to empty (DTE), a battery current state, information output, and other accurate and convenient vehicle information necessary for the driving environment.

Particularly, vehicles use digital clustering of various digital cockpits to effectively represent vehicle information in recent years. Therefore, it is necessary to develop a technology for processing these digital cockpits in an integrated manner.

Further, various display modes are required for recent vehicles to provide use convenience to drivers and passengers, and there is a demand for a technology for changing the layout of a cockpit according to these display modes.

SUMMARY

An aspect of the disclosure is to address the above-mentioned problems. Accordingly, an aspect of the present disclosure is to provide a method of changing a cockpit layout according to a display mode and a cockpit system using the same.

Particularly, an embodiment of the disclosure provides a low mode to secure a driver's forward vision among drive modes, and a system for implementing a see-through display to provide information to a driver and a passenger by transmitting light from a lower area of a front display even in the low mode.

Further, embodiments of the disclosure provide a method of selecting, as a display mode, any one mode of a first display mode group including a drive mode, a theater mode, and a relax mode, applying any one mode of a second display mode group including a standard mode, a tilt-back mode, and a low mode according to the sitting height of a driver, upon selection of the drive mode, and changing a layout, such as the position of a display and adjustment of a seat, according to the display mode.

The problems that the disclosure is to solve are not limited to the above problems, and those skilled in the art will apparently understand other unmentioned problems from the following description.

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a general aspect of the disclosure, a cockpit system for changing a display layout according to a display mode in a mobile device, includes: a front display disposed in front of a driver's seat and a passenger seat of the mobile device, the front display including display areas; a controller configured to move the front display downward, in response to a low mode being applied among display modes; and a see-through panel configured to provide information to a driver seated on the driver's seat and a passenger seated on the passenger seat by transmitting light from a lower area of the front display to the see-through panel, after the front display is moved downward.

The display mode may include at least one of a drive mode, a theater mode, a relax mode, or any combination thereof, and the drive mode may include at least one of a standard mode, a tilt-back mode, the low mode, or any combination thereof.

The mobile device may include a camera configured to recognize a position of a specific part of the driver's face, and the controller may further be configured to select any one of the standard mode, the tilt-back mode, and the low mode of the drive mode according to the position of the specific part of the driver's face, as recognized by the camera.

The controller may be further configured to: apply the tile-back mode in response to the position of the specific part of the driver's face being recognized by the camera as being equal to or higher than a first reference height; apply the low mode in response to the position of the specific part of the driver's face being recognized by the camera as being equal to or lower than a second reference height through the camera; and apply the standard mode in response to the position of the specific part of the driver's face being recognized by the camera as being between the first reference height and the second reference height.

The controller may be further configured to apply the low mode, in response to forward visibility preference of the driver or the passenger.

The controller may be further configured to control a height of the front display to be larger in the theater mode than in the drive mode.

The controller may be further configured to tilt back the driver's seat and the passenger seat and move upward a seat in a rear row of the mobile device, in the theater mode.

The display areas of the front display may include at least one of a first shy button, a first in-vehicle infotainment (IVI) display, a second IVI display, a second shy button, or any combination thereof.

In response to the low mode being applied, the information provided through the see-through panel may include information corresponding to a screen displayed through each of the first shy button, the first IVI display, the second IVI display, and the second shy button, and the information may be more simplified than information displayed through an upper part of the front display.

The cockpit system may further include an operator receiving an operation signal of the driver or the passenger.

The mobile device may include an automobile, a vehicle, a truck, an electric vehicle (EV), mobility device, and the like.

In another general aspect of the disclosure, a method of changing a cockpit layout according to a display mode in a mobile device, includes: selecting a first mode, the first mode being any one mode of a first mode group including a drive mode, a theater mode, and a relax mode; in response to the selection of the first mode corresponding to the drive mode, selecting a second mode, the second mode being any one mode of a second mode group including a standard mode, a tilt-back mode, and a low mode; in response to the selection of the second mode corresponding to the low mode, moving a front display downward; and in response to the front display being moved downward, providing information to a driver and a passenger through a see-through panel by transmitting light from a lower area of the front display to the see-through panel.

The method may further include recognizing a position of a specific part of the driver's face by a camera of the mobile device, wherein selection of the second mode may include selecting the second mode according to the position of the specific part of the driver's face as recognized by the camera.

The method may further include, in response to the position of the specific part of the driver's face being recognized as being equal to or higher than a first reference height, applying the tile-back mode, in response to the position of the specific part of the driver's face being recognized as being equal to or lower than a second reference height, applying the low mode, and in response to the position of the specific part of the driver's face being recognized as being between the first reference height and the second reference height through the camera, applying the standard mode.

The method may further include, in response to the theater mode being selected, moving the front display upward to a height higher than a height of the front display in the drive mode.

The method may further include, in response to the theater mode being selected, tilting back the driver's seat and a passenger seat; and moving upward a seat in a rear row of the mobile device.

The providing of the information through the see-through panel may include providing information in a simplified format as compared with information displayed through an upper part of the front display.

In yet another general aspect of the disclosure, a display system for a vehicle, includes: a front display disposed in front of a driver's seat and a passenger seat of the vehicle, the front display comprising display areas; a see-through panel positioned near the front display; a projector; and a controller configured to: control movement of the front display downward, in response to a mode to lower the front display being applied from among display modes; control, in response to the front display being moved downward, the projector to reflect light from a lower area of the front display to the see-through panel such that visual information is visible in the see-through panel, wherein visual information is provided to a driver seated on the driver's seat and a passenger seated on the passenger seat via the front display and the see-through panel.

The display system may be integrated in a cockpit of the vehicle.

The vehicle may include an automobile, a truck, an electric vehicle (EV), mobility device, and the like.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
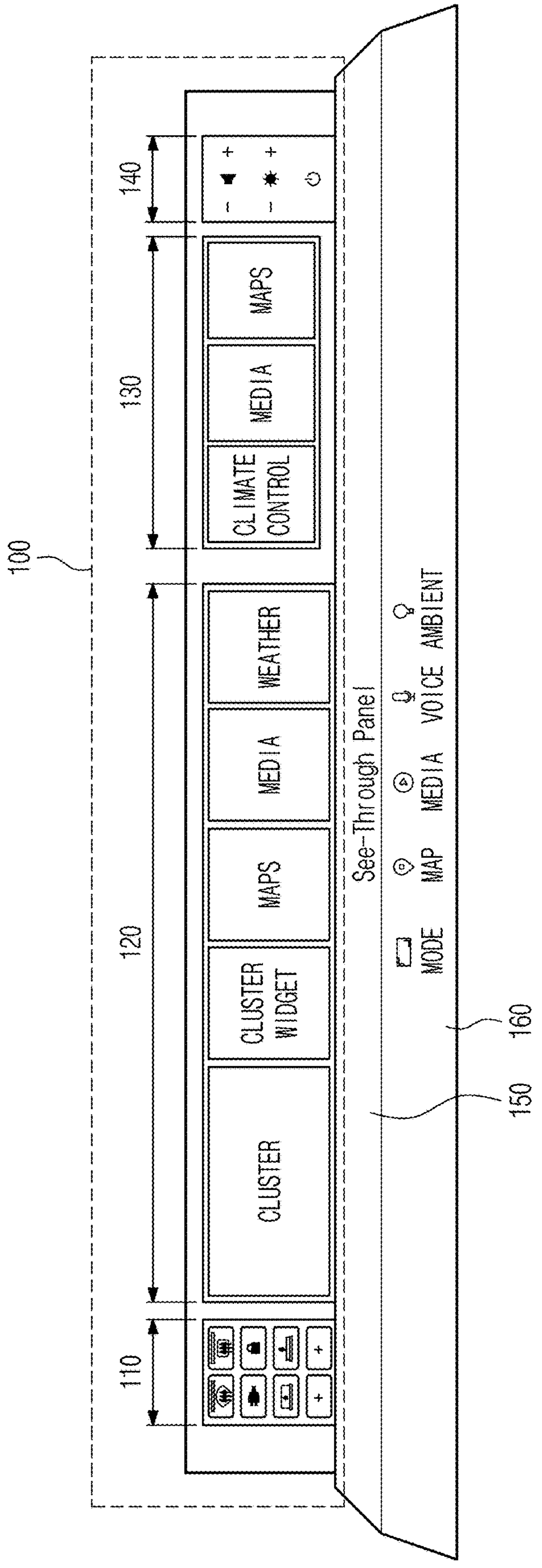
FIG. 1 is a diagram illustrating an exemplary front display including a plurality of display areas according to an embodiment of the disclosure.

Embodiments of the disclosure will be described in detail with reference to the attached drawings, so that those skilled in the art may easily implement the disclosure. However, the disclosure may be implemented in many different forms and is not limited to the embodiments described herein. In order to clearly describe the disclosure in the drawings, parts not related to the description are omitted, and similar reference numerals are assigned to similar components throughout the specification.

Throughout the specification, when a part is said to "include" a certain element, this means that it may further include other elements rather than excluding them, unless otherwise specified.

FIG. 1 is a diagram illustrating an exemplary front display including a plurality of display areas according to an embodiment of the disclosure.

It is assumed that a front display 100 illustrated in FIG. 1 is disposed in front of a driver's seat and a passenger seat in a mobile device. In other words, the front display 100 is preferably disposed across the front of the passenger seat as well as the front of the driver's seat in the mobile device. The mobile device may include an automobile, a vehicle, an autonomous vehicle, a truck, an electric vehicle (EV), a mobility device, and the like.

Additionally, the front display 100 illustrated in FIG. 1 may include a plurality of display areas 110, 120, 130, and 140. While the plurality of display areas 110, 120, 130, and 140 are shown in FIG. 1 as specifically including a first shy button 110, a first in-vehicle infotainment (IVI) display 120, a second IVI display 130, and a second shy button 140, they may be configured in various other forms.

The shy buttons 110 and 140 generally refer to buttons configured to be recognized in a user's field of view, only when needed. In the example of FIG. 1, the first shy button 110 is a shy button providing a function (e.g., a driving control-related function) that the driver may use, when needed, and the second shy button 140 is a shy button providing a function (e.g., a function related to music playback) that a passenger in the passenger seat may use, when needed.

The first IVI display 120 may play a cluster related to the driver's driving, a cluster widget, a map, media, and a weather-related application, and reset an area in which an application is displayed according to the driver's (or passenger's) operation or condition settings.

The second IVI display 130 may display applications that may be controlled by the passenger, such as weather-related control, media, and a map.

However, the above-described configuration of the display is an example, and the corresponding areas may be displayed in an integrated manner according to the driver/passenger's operation or condition settings. For example, when a display mode is set to a theater mode as described later, a single integrated image may be displayed across the first IVI display 120 and the second IVI display 130.

In an embodiment of the disclosure, it is proposed to support a low mode to secure the driver's forward vision among display modes. During a low-mode operation, the front display 100 may be moved downward by a controller (not shown).

In an embodiment of the disclosure, it is further proposed to include a see-through panel 150 as illustrated in FIG. 1. As described above, the front display 100 may be configured such that when the front display 100 is moved downward by applying the low mode, light from a lower area of the front display 100 provides information to the driver and the passenger through the see-through panel 150.

It is assumed that the information provided through the see-through panel 150 is information corresponding to a screen displayed through each of the first shy button 110, the first IVI display 120, the second IVI display 130, and the second shy button 140. The information provided through the see-through panel 150 is preferably simplified information, compared to information displayed in an upper part of the front display 100. "Simplified information" may refer to information that may be represented at a low resolution, in a small amount, or in a combination of both, compared to information displayed in the upper part of the front display 100.

As illustrated in FIG. 1, a cockpit system according to an embodiment of the disclosure may further include an operating system 160. The operating system 160 may be implemented in a projection manner, as described later.

Figure 2:
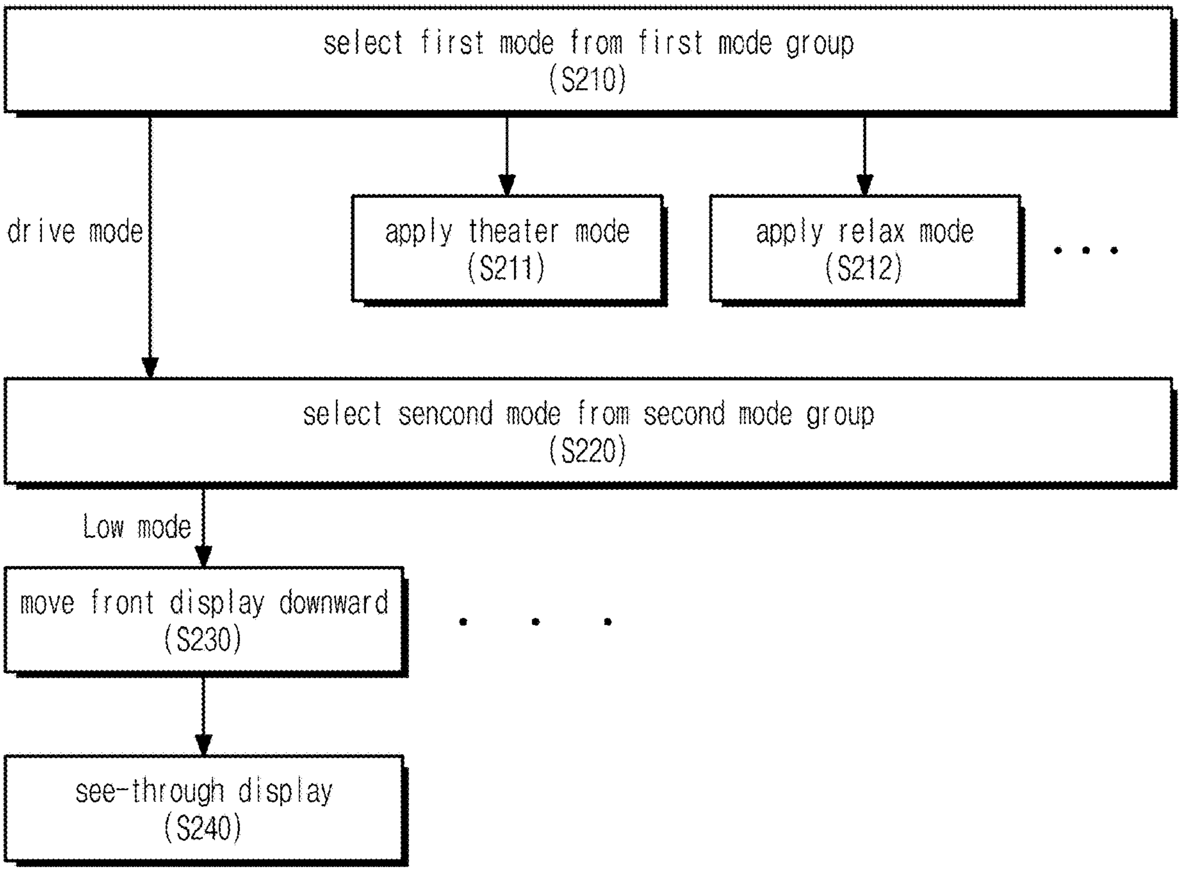
FIG. 2 is a diagram illustrating a method of changing a cockpit layout according to a display mode according to an embodiment of the disclosure.

FIG. 2 is a diagram illustrating a method of changing a cockpit layout according to a display mode in an embodiment of the disclosure.

First, in the embodiment illustrated in FIG. 2, a first mode, which is any one mode of a first mode group including a drive mode, a theater mode, and a relax mode, may be selected (S210). The first mode group is a mode group selected depending on whether the mobile device is driving, whether there is a passenger, and whether media is being viewed. In addition to the drive mode, the theater mode, and the relax mode, the first mode group may include various types of modes such as an autonomous drive mode and an individual viewing mode. However, the following description is given in the context of the three examples: drive mode, theater mode, and relax mode, by way of example.

When the selected first mode is the theater mode, the front display and/or the seat layout of the mobile device may be adjusted by applying the theater mode (S211), which will be described later. Further, when the selected first mode is the relax mode, the front display and/or the seat layout of the mobile device may be adjusted by applying the relax mode (S212), which will be described later.

In an embodiment of the disclosure, it is proposed that when the selected first mode is the drive mode, a second mode, which is any one mode of a second mode group including a standard mode, a tilt-back mode, and the low mode, is selected (S220).

The second mode group refers to display modes classified according to the driver's conditions in the drive mode. Although the second mode group may include various other types of modes such as a driver seat upward mode and a driver seat tilt-back mode in addition to the standard mode, the tilt-back mode, and the low mode, the following description will be given in the context of the three examples: standard mode, tilt-back mode, and low mode, by way of example.

Selecting the second mode may include measuring a specific part (e.g., eye/nose position) of the driver's face through a camera (e.g., driver status monitoring (DSM) camera) and selecting the second mode according to the position of the specific part.

For example, when the position of the specific part is equal to or higher than a first reference height (e.g., 1 m), which corresponds to a large sitting height of the driver, the tilt-back mode may be applied to efficiently display the front display to the driver. When the position of the specific part is equal to or lower than a second reference height (e.g., 70 cm), which corresponds to a small sitting height of the driver, the low mode may be applied to secure the driver's forward vision. Additionally, when the position of the specific part is between the first reference height and the second reference height, the standard mode may be applied to secure the forward vision and increase display efficiency depending on the state of the driver.

In an embodiment of the disclosure, it is proposed that when the second mode selected in step S220 is the low mode, the front display is moved downward (S230), and as described above with reference to FIG. 1, information is provided to the driver and the passenger by transmitting light from the lower area of the front display moved downward through the see-through panel (S240).

Figure 3:
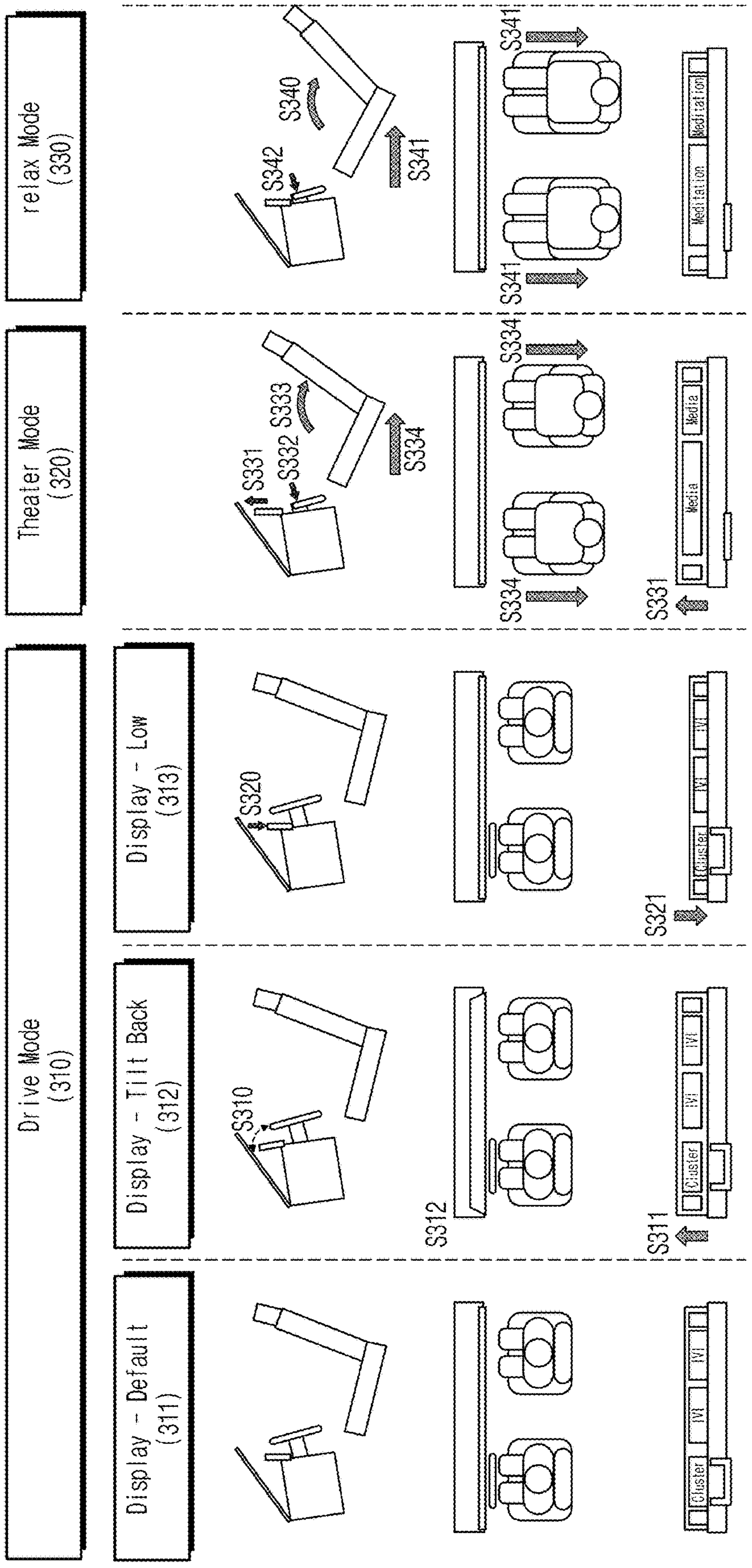
FIG. 3 is a diagram illustrating specific cockpit layout changes according to an embodiment of the disclosure.

FIG. 3 is a diagram illustrating specific cockpit layout changes according to an embodiment of the disclosure.

In the embodiment of FIG. 3, as described above with reference to FIG. 2, display modes are largely divided into three modes: a drive mode 310, a theater mode 320, and a relax mode 330. In addition, the drive mode 310 is shown as divided into three modes: a standard mode 311, a tilt-back mode 312, and a low mode 313.

Specifically, in the drive mode 310, the tilt-back mode 312 may be considered as a mode in which the front display is tilted backward in consideration of the driver's high gaze direction (S310). Accordingly, the overall height of the front display has the effect of being raised (S311). In FIG. 3, when viewed from above the driver's seat and the passenger seat in the tilt-back mode 312, the front display is displayed tilted backward, compared to the standard mode (S312).

Additionally, the low mode 313 of the drive mode 310 may be considered as a mode in which the front display is moved downward in consideration of the driver's low gaze direction (S320 and S321). This improves the driver's forward vision, and as described above with reference to FIGS. 1 and 2, light from the lower area of the front display may be used to provide simplified information to the driver/passenger through the see-through panel.

In the theater mode 320, the front display is preferably moved upward such that its height is larger than in the drive mode 310 (S331). Additionally, the driver's seat/passenger seat is preferably tilted back (S333) and moved backward (S334).

FIG. 3 illustrates an example in which a steering wheel is also moved in a direction away from the driver to provide a sufficient space for the driver to comfortably watch a movie (S332). Preferably, the front display may implement a single display suitable for watching movies by integrating the plurality of display areas, as illustrated in FIG. 3.

Additionally, in the relax mode 330, the driver's seat/passenger seat may be tilted back to provide comfortable rest to the driver/passenger (S340). Additionally, the driver's seat/passenger seat is preferably moved backward (S341). In this case, the steering wheel may also be moved in the direction away from the driver, thereby providing a comfortable resting space for the driver (S342).

Figure 4:
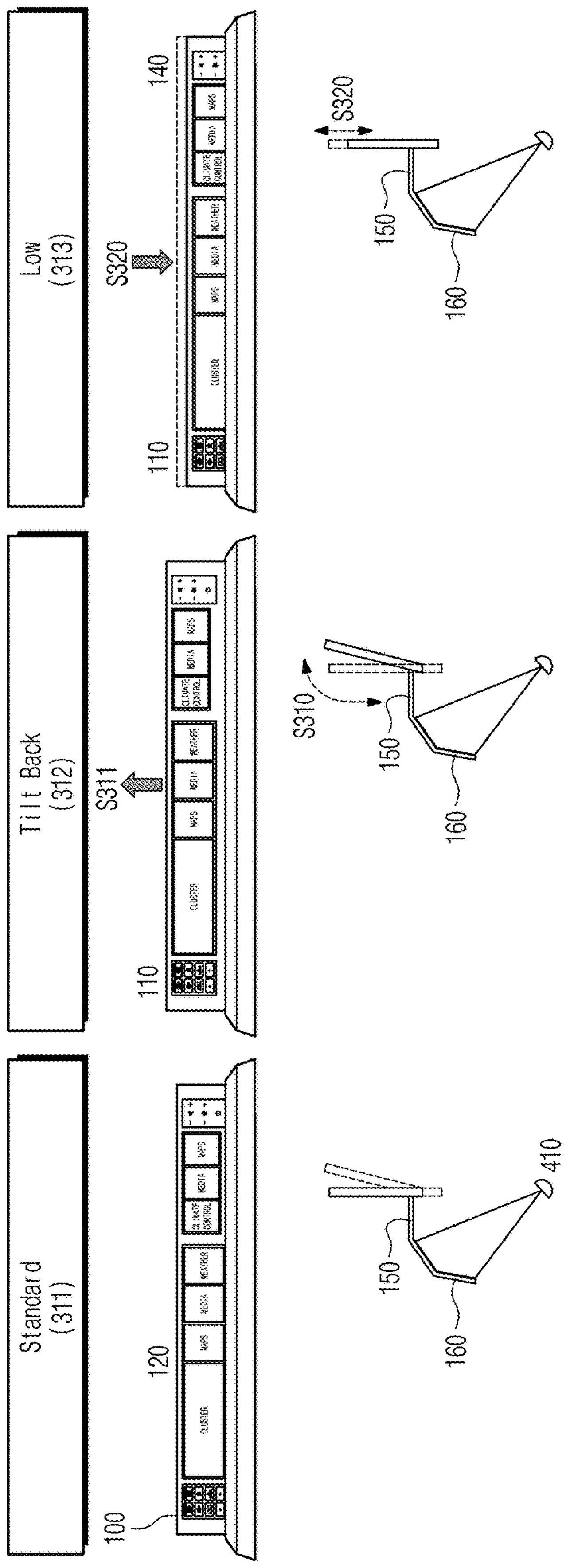
FIG. 4 is a detailed diagram illustrating a display position in each display mode of a drive mode according to an embodiment of the disclosure.

FIG. 4 is a detailed diagram illustrating a display position in each display mode of the drive mode according to an embodiment of the disclosure.

First, in the embodiment illustrated in FIG. 4, the display position in the standard mode 311 is preferably set to a height at which the bottom line of a display active area of the first IVI display of the front display 100 is not covered by the see-through panel 150.

Next, in the embodiment illustrated in FIG. 4, in the tilt-back mode 312, the height of the driver's eyes/nose may be measured, and the front display 100 may be tilted back accordingly (S310), to improve display efficiency for the driver, as described before. Additionally, in a preferred embodiment of the disclosure, it may be configured to finely adjust the tilt-back degree of the front display 100 through the first shy button 110.

Lastly, in the embodiment illustrated in FIG. 4, in the low mode 313, the driver's eye/nose height may be measured, and the front display 100 may be moved downward to secure the front vision (S320), as described above. In this case, it may be configured to provide simplified information through light from the bottom of the front display 100 through the see-through panel 150, as described above.

In an embodiment of the disclosure, in the low mode 313, there are areas in lower parts of the shy buttons 110 and 140, which are covered by the downward movement of the display, and in view of the characteristics of the shy buttons 110 and 140, it may not be efficient to use light from the bottoms of the shy buttons 110 and 140 to provide information through the see-through panel 150. Accordingly, it may be configured that the arrangement of buttons are changed in areas of the shy buttons 110 and 140 which are not covered in the low mode 313 to maintain the existing functions of the shy buttons, unlike the IVI displays 120 and 130.

FIG. 4 illustrates an embodiment in which the operating system 160 is implemented in a projection manner using an internal projector 410. To implement a display-type operating system 160, a light-emitting display such as an LED display may be used. However, there are many curves/curved surfaces in the interior space of the mobile device, specifically a vehicle, and it is difficult to implement the light-emitting display in consideration of these interior characteristics.

Therefore, in an embodiment of the disclosure, the operating system 160 may be configured in a projection manner using the internal projector 410 at the front of the mobile device. The operating system 160 may be advantageously implemented freely even in a space with various curves/curved surfaces, as illustrated in FIG. 4.

Figure 5:
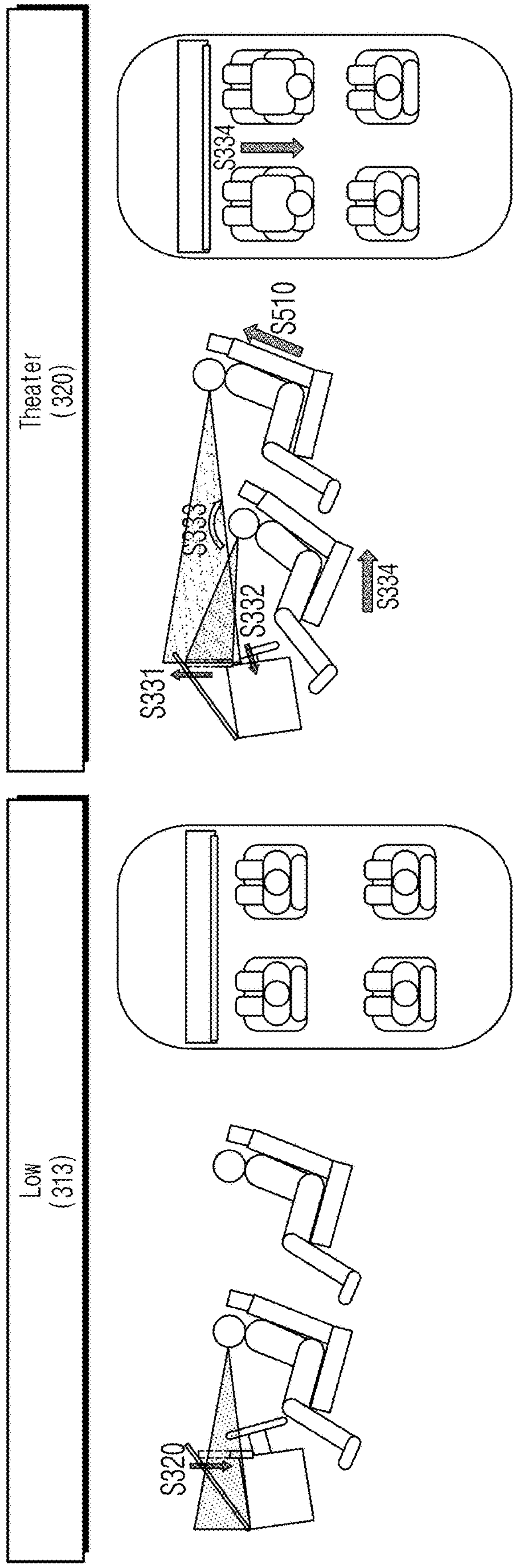
FIG. 5 is a diagram illustrating a method of securing a driver/passenger's field of view according to an embodiment of the disclosure.

FIG. 5 is a diagram illustrating a method of securing a driver/passenger's field of view according to an embodiment of the disclosure.

The left side of FIG. 5 illustrates the concept of securing the driver's forward vision in the low mode 313. As described above, the front display may be moved downward, and light from the lower area of the front display may be used to provide simplified information through the see-through panel.

The right side of FIG. 5 illustrates the concept of securing visions for the driver/passenger in the driver's seat/passenger seat and passengers in rear seats in the theater mode 320. Preferably, the front display is moved upward to a higher position than in the drive mode (S331), and the driver's seat/passenger seat is tilted back (S333) and moved backward (S334), as described above. The steering wheel may be moved in the direction away from the driver to provide a sufficient space (S332).

In this embodiment, it is further proposed to move upward the seats in the rear row to secure visions for the passengers in the rear seats as well as for the driver/passenger in the driver's seat/passenger seat (S510). A line of sight toward the front display may be secured for the passengers in the rear seats by the combination of the front seats' tilt-back (S333) and the rear seats' upward movement (S510).

Figure 6:
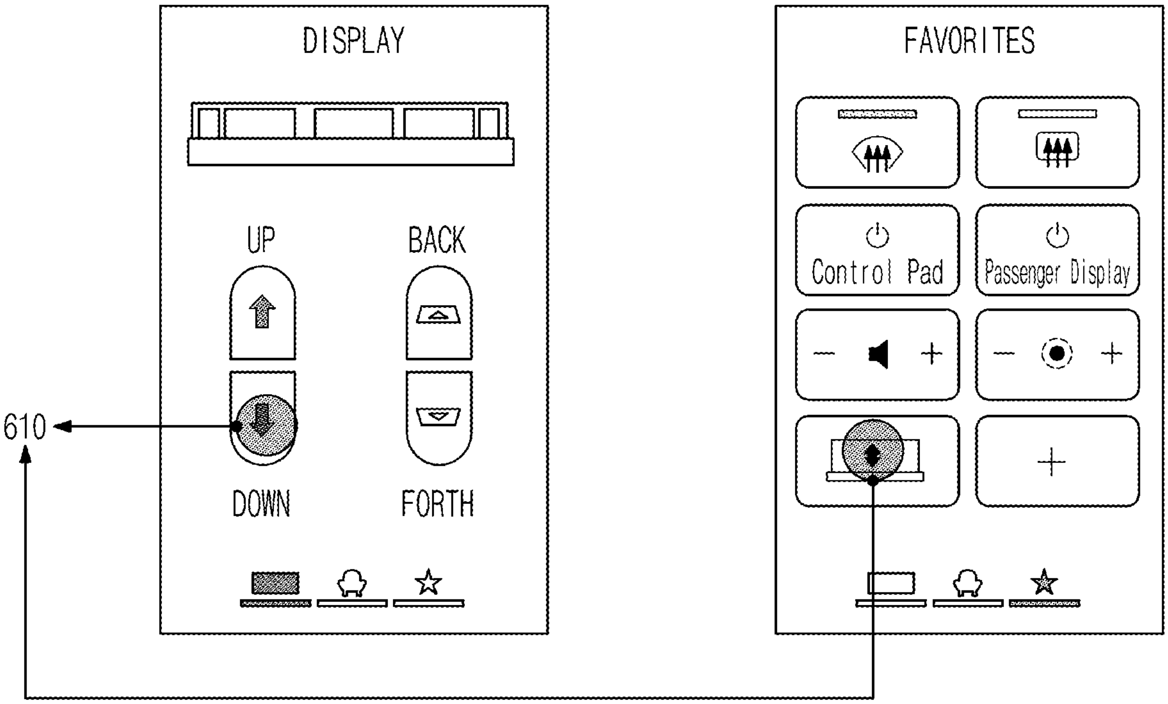
FIGS. 6 and 7 are diagrams illustrating the concept of an operator according to embodiments of the disclosure.
Figure 7:
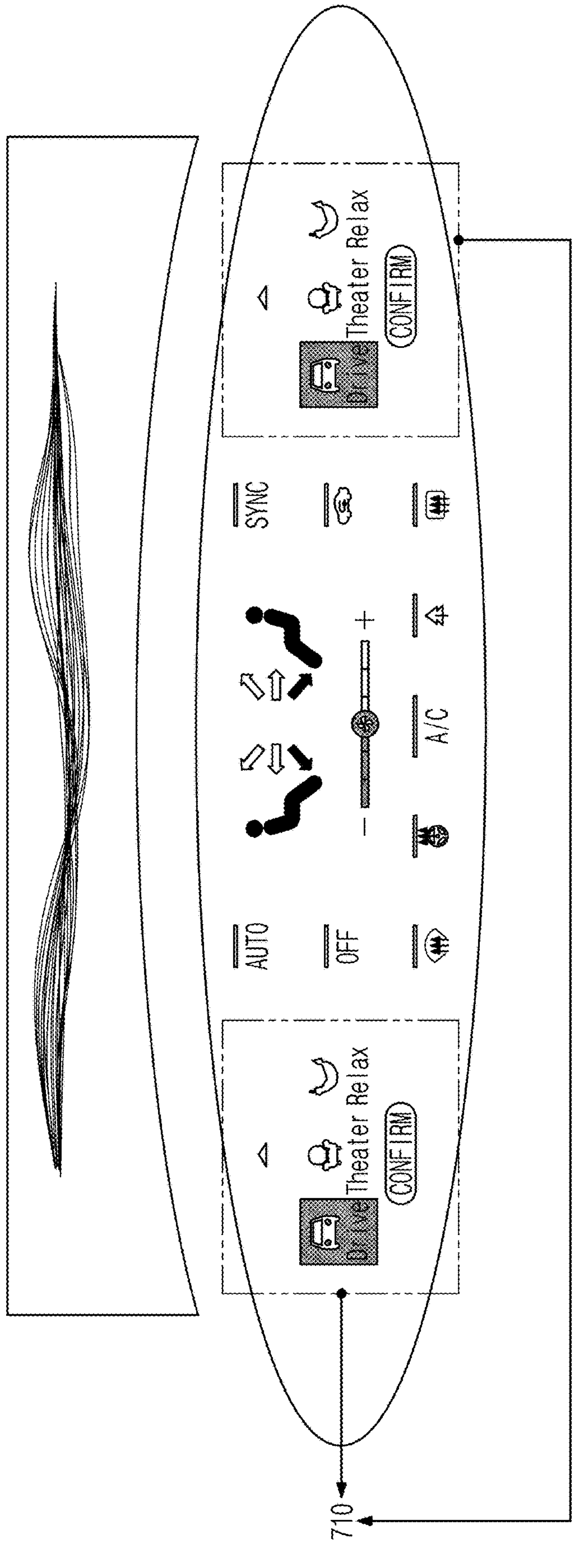

FIGS. 6 and 7 are diagrams illustrating the concept of an operator according to embodiments of the disclosure.

According to embodiments of the disclosure, the movement of the front display and the movement of the seats described above may be performed by receiving an operation signal from the driver or passenger, and FIGS. 6 and 7 illustrate examples of the operator according to these embodiments.

FIG. 6 illustrates the concept of a display movement button 610. The left side of FIG. 6 illustrates an operator 610 that displays a button combination for upward/downward movement of the front display and a button combination for tilt forward/tilt back of the front display. In addition, the right side of FIG. 6 illustrates the implementation of the operator 610 added to favorites on a display.

The operator 610 illustrated in FIG. 6 may be displayed as an application on the front display, disposed in the projection-type operating system 160 described above with reference to FIG. 4, or disposed separately on a handle to the right of the driver's seat.

FIG. 7 illustrates an exemplary operator 710 implemented so that display modes including seat movement may be selected on the projection-type operator 160. In the example illustrated in FIG. 7, the operator 710 provides a button combination with which to select the drive mode, the theater mode, and the relax mode. Obviously, the operator 710 may be configured such that only modes related to seat arrangement are separately displayed and selected.

Figure 8:
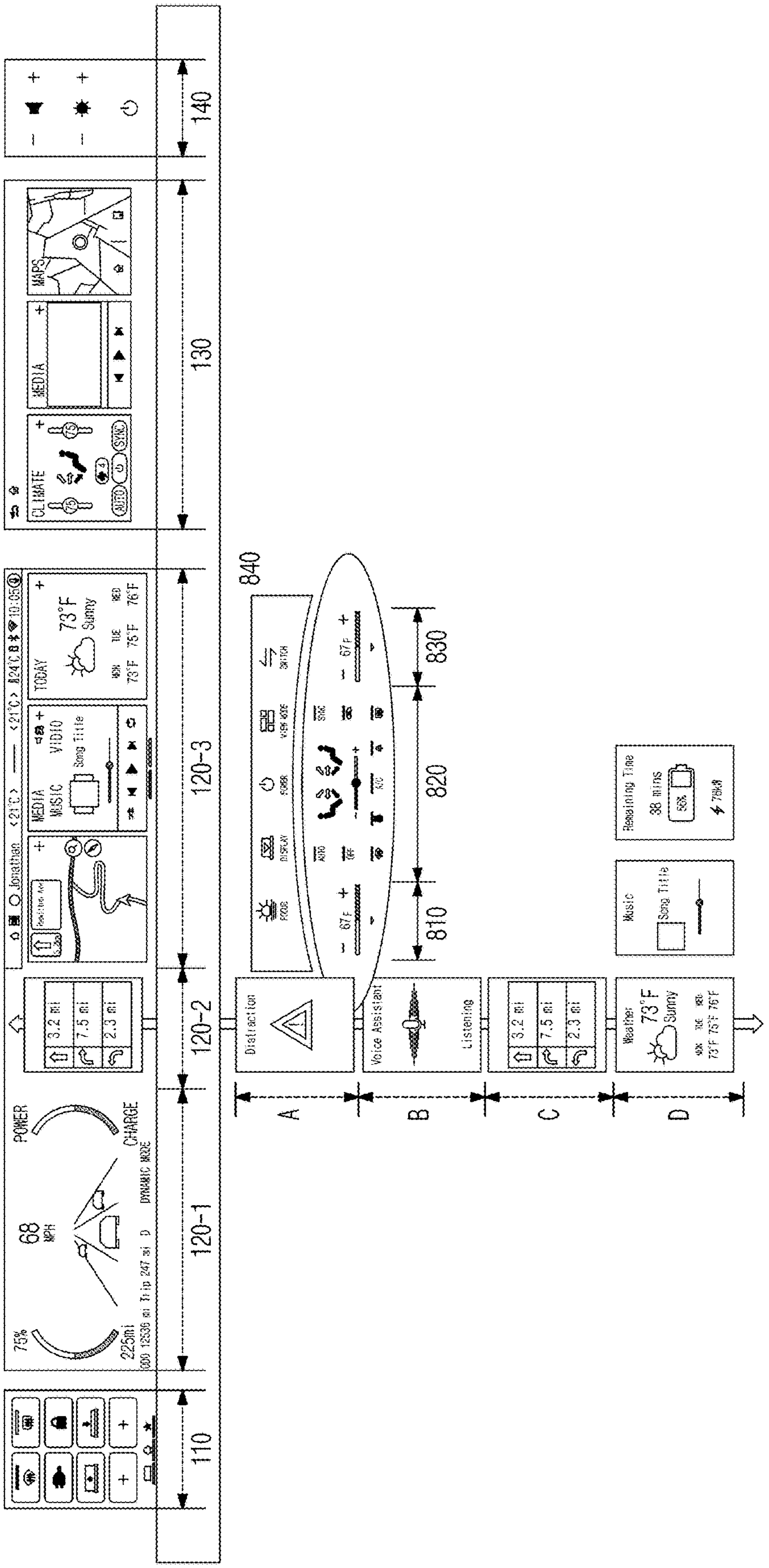
FIG. 8 is a diagram illustrating content displayed through a front display in a standard mode of a drive mode according to an embodiment of the disclosure.

FIG. 8 is a diagram illustrating content displayed through the front display in the standard mode of the drive mode according to an embodiment of the disclosure.

In the embodiment of FIG. 8, the front display includes the first shy button 110, the first IVI display 120, the second IVI display 130, and the second shy button 140, as in the example of FIG. 1, and the first IVI display 120 is displayed separately into a cluster 120-1, a cluster widget 120-2, and an IVI 120-3.

Specifically, the cluster 120-1 may display a cluster screen related to driving information. In the example of FIG. 8, the cluster 120-1 displays driving navigation information, a vehicle speed, a mileage, and the battery state of an electric vehicle.

The cluster widget 120-2 displays information in the form of a widget. In the example of FIG. 8, warning information A, virtual personal assistant (VPA) B, turn by turn (TBT) C, and an information-type widget are selected with first to fourth priorities, respectively. However, this is an exemplary configuration, to which the disclosure is not limited.

Unlike the second IVI display 130 for the passenger seat, the IVI 120-3 may provide an IVI display for the driver. In the example of FIG. 8, a map, media, and weather information are provided. However, this is only an exemplary configuration, to which the disclosure is not limited.

In the embodiment illustrated in FIG. 8, the operating system is divided into a driver operating system 810, a heating, ventilating, and air conditioning (HVAC) operator 820, and a passenger operating system 830. In addition, an upper part of the operating system includes an operation button unit 840 displayed in the form of a shortcut, and the position of the shortcut is preferably exchangeable with the position of an animation form in a lower part.

Figure 9:
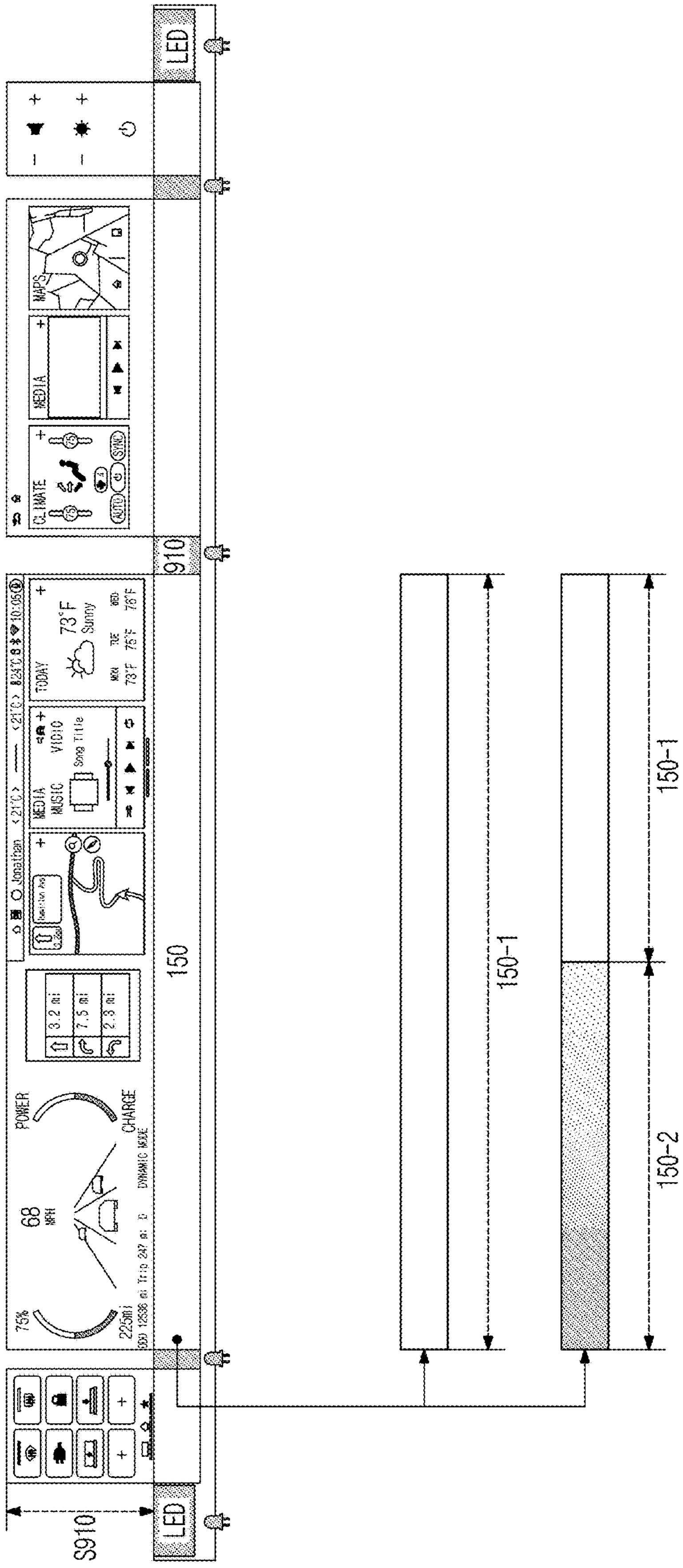
FIG. 9 is a diagram illustrating content displayed through a front display in a low mode of a drive mode according to an embodiment of the disclosure.

FIG. 9 is a diagram illustrating content displayed on the front display in the low mode of the drive mode according to an embodiment of the disclosure.

In the embodiment of FIG. 9, it is also assumed that a plurality of display areas of the front display are the same as in the embodiment of FIG. 8. Herein, it is configured that as the low mode is applied, the front display is moved downward (S910), and light emitted from the lower area of the front display provides additional information through the see-through panel 150.

Preferably, a display through the see-through panel 150 displays simplified information, compared to the upper area of the front display, and a background color 150-1 is preferably a subdued color that may provide comfort to the driver/passenger. However, when information provided through the see-through panel 150 delivers a warning message to the driver/passenger, the see-through display is preferably performed by applying an intense color 150-2 that may provide alertness.

In the embodiment of FIG. 9, there are areas in the lower parts of the shy buttons 110 and 140 in the low mode, which are covered due to the downward movement of the display, and in view of the characteristics of the shy buttons 110 and 140, it may not be efficient to use light from the bottoms of the shy buttons 110 and 140 to provide information through the see-through panel 150. Accordingly, it is proposed that the shy buttons 110 and 140 are configured such that the arrangement of buttons is changed to maintain existing functions of the shy buttons in areas that are not covered in the low mode 313, unlike the IVI displays 120 and 130 (S910).

Additionally, the embodiment of FIG. 9 proposes that a separate light-emitting display 910 (e.g., an LED display) is disposed in an area in which a see-through display through the see-through panel 150 may not be performed, in a border area between a plurality of display areas. This light-emitting display 910 may be configured to provide additional information, and as described later, serve as an indoor mood light together with the see-through display area 150.

Figure 10:
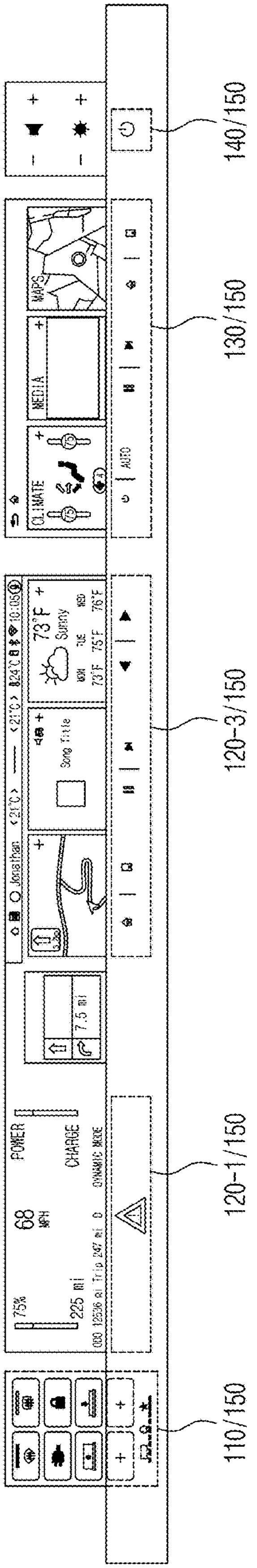
FIGS. 10 and 11 are diagrams illustrating content displayed through a see-through panel according to embodiments of the disclosure.
Figure 11:
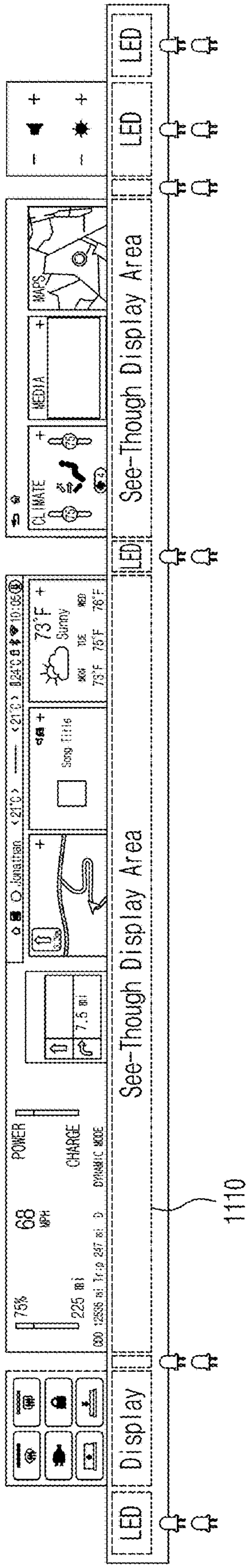

FIGS. 10 and 11 are diagrams illustrating content displayed through a see-through panel according to embodiments of the disclosure.

As described above, when the low mode is applied, the front display may be moved downward with the plurality of display areas as a unit, and light from the lower area of the front display may provide simplified information through the see-through panel 150, compared to information displayed in the upper part of the front display.

As in the embodiment of FIG. 10, the information displayed through the see-through panel may include information corresponding to each of the plurality of display areas in the upper part of the front display. That is, when the plurality of display areas of the front display include the first shy button 110, the first IVI display 120, the second IVI display 130, and the second shy button 140, and among them, the first IVI display 120 is divided into the cluster 120-1, the cluster widget 120-2, and the IVI 120-3 as described above, information corresponding to each of these areas may be displayed through the see-through panel 150.

In the embodiment of FIG. 10, when driving information is displayed through the cluster 120-1, information displayed through the corresponding see-through panel 150 may be a driving-related warning message 120-1/150, which is simplified information corresponding to the driving information. In addition, when a specific widget is performed through the IVI 120-3 and/or the second IVI display 130, a shortcut function button 120-3/150 and/or 130/150 of the specific widget may be displayed through a corresponding area of the see-through panel 150.

The shy buttons 110 and 140 may be configured such that in view of the characteristics of the shy buttons, display information of the shy buttons 110 and 140 is also maintained through the see-through panel 150 as indicated by reference numerals 110/150 and/or 140/150. That is, unlike the IVI displays, the shy buttons 110 and 140 often display simplified information, and in this case, a lower area of the same content may also be displayed through the see-through panel 150.

In some cases, however, function buttons corresponding to the upper parts of the shy buttons 110 and 140 may be displayed, in further simplified buttons, compared to the function buttons corresponding to the upper parts. For example, it may be configured that when icons of buttons displayed in the upper parts of the shy buttons 110 and 140 require a high resolution, simplified forms of the icons are displayed through the see-through panel 150.

In the embodiment illustrated in FIG. 11, the whole see-through panel 150 may be configured to perform the function of a mood lamp 1110 for interior decoration, instead of providing specific information. In this case, as described above with reference to FIG. 9, the uninterrupted mood lamp 1110 may be configured using the light-emitting display 910 at each of borders between the areas as well as the see-through panel 150. Even in an embodiment in which the see-through panel 150 and the light-emitting display 910 are used as the mood lamp 1110, driving-related warning information may be provided through a color of the mood lamp 1110.

According to the embodiments of the disclosure described above, a method of changing a cockpit layout according to a display mode and a cockpit system using the same may be efficiently configured.

Specifically, in an embodiment of the disclosure, the forward vision of a driver may be easily secured through a low mode even during a drive mode, and information may also be provided to the driver and a passenger by transmitting light from a lower area of a front display through a see-through display even in the low mode.

Further, in embodiments of the disclosure, it is configured that any one mode of a first display mode group including a drive mode, a theater mode, and a relax mode is selected as a display mode. Accordingly, various modes are available for a user.

Further, when the drive mode is selected, any one mode of a second display mode group including a standard mode, a tilt-back mode, and a low mode is applied in consideration of the sitting height of a driver, and a layout such as a display position and seat adjustment is changed according to the display mode, thereby increasing driving safety.

As described above, a detailed description of preferred embodiments of the disclosure has been given to enable those skilled in the art to implement and practice the disclosure. While the above description has been made with reference to the preferred embodiments of the disclosure, it will be understood by those skilled in the art that various modifications and changes may be made to the disclosure without departing from the scope of the disclosure. For example, those skilled in the art may use the configurations described in the above-described embodiments in combination with each other.

Accordingly, the embodiments as set forth herein are not intended to limit the disclosure, but rather to give the broadest possible scope consistent with the principles and novel features disclosed herein.

What is claimed is:

1. A cockpit system for changing a display layout according to a display mode in a mobile device, the cockpit system comprising:
- a front display disposed in front of a driver's seat and a passenger seat of the mobile device, the front display including a plurality of display areas;
- a see-through panel disposed near the front display and configured to provide information to a driver seated on the driver's seat and a passenger seated on the passenger seat; and
- a controller configured to adjust a height and/or a tilt of the front display in response to selection of a mode among a drive mode, a theater mode, and a relax mode,
- wherein the drive mode includes a default mode, a tilt-back mode in which the height of the front display is raised, and a low mode in which the front display is lowered,
- wherein the controller is further configured to, in response to the front display being moved downward, provide information to the driver and the passenger through the see-through panel by projecting display information from a lower area of the front display to the see-through panel,
- wherein the controller is further configured to:
  - in the theater mode, tilt back the driver's seat and the passenger seat and move upward a seat in a rear row of the mobile device;
  - in the relax mode, tilt back the driver's seat and the passenger seat;
  - in the default mode, position the driver's seat and the passenger seat at default settings;
  - in the tilt-back mode, tilt the front display backward,
- wherein the mobile device includes a camera configured to recognize a position of a specific part of the driver's face, and
- wherein the controller is further configured to select the default mode, the tilt-back mode, or the low mode of the drive mode according to the position of the specific part of the driver's face, as recognized by the camera.

2. The cockpit system of claim 1, wherein the controller is further configured to:
- apply the tilt-back mode in response to the position of the specific part of the driver's face being recognized by the camera as being equal to or higher than a first reference height;
- apply the low mode in response to the position of the specific part of the driver's face being recognized by the camera as being equal to or lower than a second reference height through the camera; and
- apply the default mode in response to the position of the specific part of the driver's face being recognized by the camera as being between the first reference height and the second reference height.

3. The cockpit system of claim 1, wherein the controller is further configured to apply the low mode according to a forward visibility preference of the driver or the passenger.

4. The cockpit system of claim 1, wherein the controller is further configured to move the front display higher in the theater mode than in the drive mode.

5. The cockpit system of claim 1, wherein the plurality of display areas of the front display include at least one of a first shy button, a first in-vehicle infotainment (IVI) display, a second IVI display, or a second shy button and
- wherein the shy button appears in a user's field of view only when needed.

6. The cockpit system of claim 5,
- wherein, in response to the low mode being applied, the information provided through the see-through panel includes information corresponding to a screen displayed through each of the first shy button, the first IVI display, the second IVI display, and the second shy button, and
- wherein the information, in the low mode, is more simplified than information displayed through an upper part of the front display at a lower resolution and/or smaller amount.

7. The cockpit system of claim 1, further comprising:
- an operator receiving an operation signal of the driver or the passenger.

8. The cockpit system of claim 1, wherein the mobile device comprises at least one of an automobile, a vehicle, an autonomous vehicle, a truck, an electric vehicle (EV), or a mobility device.

9. A method of changing a cockpit layout according to a display mode in a mobile device, the method comprising:
- selecting a first mode, the first mode being any one mode of a first mode group including a drive mode, a theater mode, and a relax mode;
- in response to the selection of the first mode corresponding to the drive mode, selecting a second mode, the second mode being any one mode of a second mode group including a default mode, a tilt-back mode in which the height of a front display is raised, and a low mode in which the front display is lowered;
- in response to the selection of the second mode corresponding to the low mode, moving a front display downward, the front display disposed in front of a driver's seat and a passenger seat of the mobile device; and
- in response to the front display being moved downward, providing information to a driver and a passenger through a see-through panel by projecting display information from a lower area of the front display to the see-through panel, wherein, in the theater mode, the driver's seat and the passenger seat are tilted back and a seat in a rear row of the mobile device is moved upward, wherein, in the relax mode, the driver's seat and the passenger seat are tilted back, wherein, in the default mode, the driver's seat and the passenger seat at positioned at default settings, wherein, in the tilt-back mode, the front display is tilted backward, wherein the method further comprises recognizing a position of a specific part of the driver's face by a camera of the mobile device, and wherein selection of the second mode includes selecting the second mode according to the position of the specific part of the driver's face as recognized by the camera.

10. The method of claim 9, further comprising:

in response to the position of the specific part of the driver's face being recognized as being equal to or higher than a first reference height, applying the tilt-back mode, in response to the position of the specific part of the driver's face being recognized as being equal to or lower than a second reference height, applying the low mode, and in response to the position of the specific part of the driver's face being recognized as being between the first reference height and the second reference height through the camera, applying the default mode.

11. The method of claim 9, further comprising:

in response to the theater mode being selected, moving the front display higher than the front display in the drive mode.

12. The method of claim 11, further comprising:

in response to the theater mode being selected, tilting back the driver's seat and a passenger seat; and moving upward a seat in a rear row of the mobile device.

13. The method of claim 9, wherein the providing of the information through the see-through panel includes providing information in a simplified format as compared with information displayed through an upper part of the front display, and wherein, in the simplified format, information is displayed at a lower resolution and/or reduced.

14. A display system for a vehicle, the system comprising:

a front display disposed in front of a driver's seat and a passenger seat of the vehicle, the front display comprising a plurality of display areas;

a see-through panel positioned near the front display;

a projector; and a controller configured to:

adjust a height and/or a tilt of the front display in response to selection of a mode among a drive mode, a theater mode, and a relax mode, the drive mode including a default mode, a tilt-back mode in which the height of the front display is raised, and a low mode in which the front display is lowered;

control movement of the front display downward, in response to an application of the low mode; and control, in response to the front display being moved downward, the projector to projecting display information from a lower area of the front display to the see-through panel such that visual information is visible in the see-through panel, wherein visual information is provided to a driver seated on the driver's seat and a passenger seated on the passenger seat via the front display and the see-through panel.

15. The system of claim 14, wherein the display system is integrated in a cockpit of the vehicle.

16. The system of claim 14, wherein the vehicle comprises at least one of an automobile, a truck, an electric vehicle (EV), an autonomous vehicle, or a mobility device.

* * * * *